US010762550B2

(12) United States Patent
Clausse et al.

(10) Patent No.: US 10,762,550 B2
(45) Date of Patent: Sep. 1, 2020

(54) CONTEXTUAL SERVICE SYSTEMS AND METHODS

(71) Applicant: Amadeus SAS, Cedex (FR)

(72) Inventors: Julien Marie Clausse, Opio (FR); Loïc Luc Ludovic Driencourt, Chateauneuf (FR); Jonathan Paul Tuckey, Mougins (FR); Simon Artige, Antibes (FR); Elsa Yvette Joelle-Elisa Anselmet, Antibes (FR)

(73) Assignee: Amadeus SAS, Sophia Antipolis (FR)

( * ) Notice: Subject to any disclaimer, the term of this patent is extended or adjusted under 35 U.S.C. 154(b) by 225 days.

(21) Appl. No.: 15/813,058

(22) Filed: Nov. 14, 2017

(65) Prior Publication Data

US 2018/0137555 A1      May 17, 2018

Related U.S. Application Data

(60) Provisional application No. 62/422,580, filed on Nov. 15, 2016.

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06Q 10/02* (2013.01); *G06Q 30/0282* (2013.01); *G06Q 50/10* (2013.01); *G06Q 30/0639* (2013.01)

(58) Field of Classification Search
USPC ...................................................... 705/26.1
See application file for complete search history.

(56) References Cited

U.S. PATENT DOCUMENTS

| 2008/0052026 A1* | 2/2008 | Amidon | H04N 5/23203 |
| | | | 702/104 |
| 2011/0184960 A1* | 7/2011 | Delpha | G06F 17/241 |
| | | | 707/754 |

(Continued)

OTHER PUBLICATIONS

Extended European Search Report and Written Opinion dated Mar. 29, 2018, directed to corresponding EP Application No. 17201623.0; 10 pages.

(Continued)

*Primary Examiner* — Mila Airapetian
(74) *Attorney, Agent, or Firm* — Finnegan, Henderson, Farabow, Garrett & Dunner LLP (57) ABSTRACT

The disclosed systems and methods include a contextual recommendation engine comprising at least one processor; and at least one non-transitory memory containing instructions. When executed by the at least one processor the instructions cause the contextual recommendation engine to perform operations. The operations include receiving a description of a first service from a service provider. The operations also include receiving content selection rules that map user contexts to services. The operations also include receiving a first script including instructions for providing services. The operations also include associating the first service with the first script. The operations also include receiving, from a first touchpoint, touchpoint data concerning a first user. The operations also include updating a stored context of the first user based on the touchpoint data. The operations also include selecting the first service based on the updated context and the content selection rules. The operations also include providing the first service to the first user according to the first script.

19 Claims, 7 Drawing Sheets

(51) Int. Cl.
    *G06Q 10/02*    (2012.01)
    *G06Q 30/02*    (2012.01)
    *G06Q 50/10*    (2012.01)

(56) References Cited

U.S. PATENT DOCUMENTS

2012/0122476 A1\* 5/2012 Lee .................. H04W 4/029
                                                    455/456.1
2014/0351052 A1   11/2014 Khalsa et al.
2017/0308651 A1\* 10/2017 Pattni ................. G16H 40/20
2017/0330215 A1\* 11/2017 Bruno ............... G06Q 30/0224

OTHER PUBLICATIONS

Keidl et al. "Towards Context-Aware Adaptable Web Services" WWW2004, May 17-22, 2004, New York, New York, USA ACM 1-58113-912-8/04/0005 (11 pgs).

Yang et al. 2008 "A JESS-enabled context elicitation system for providing context-aware Web services" Expert Systems with Applications 34 pp. 2254-2266.

\* cited by examiner

CONTEXTUAL SERVICE SYSTEMS AND METHODS

RELATED APPLICATIONS

This application claims the benefit of priority to U.S. Provisional Patent Application No. 62/422,580 filed Nov. 15, 2016, the contents of which are incorporated herein by reference in their entirety.

TECHNICAL FIELD

The disclosed systems and methods generally concern computerized systems for contextual recommendation of services to a user, based on contextual information provided at least in part by touchpoints associated with the user.

SUMMARY

The disclosed systems and methods may enable contextual service provision. As everyday devices are increasingly networked, the number of information exchange touchpoints between service providers and users continues to increase. These networked devices may also be used to provide information about the current context of a user. The envisioned systems and methods may use this contextual information to provide relevant servicers to the users. These services may be provided in a form adapted to suit the particular information exchange touchpoint. For example, a mobile phone may receive a recommendation in the form of an SMS message, while an automobile user interface may receive instructions to provide the recommendation in the form of audio instructions.

The disclosed systems and methods disclose a specific implementation that enables this technological improvement. In some embodiments, touchpoint-independent scripts abstract the provision of services, enabling service providers to provide service descriptions without advance knowledge of available consumer touchpoints. In various embodiments, a content extraction engine provides a single connection point for multiple data sources, enabling extraction of contextual information using data source specific schemas. In some embodiments, a decision engine may select potentially available services, which are then validated by a services engine. This architecture may allow provision of services relevant to a particular context without requiring service providers to constantly communicate current service information, reducing infrastructure requirements associated with the disclosed systems and methods.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
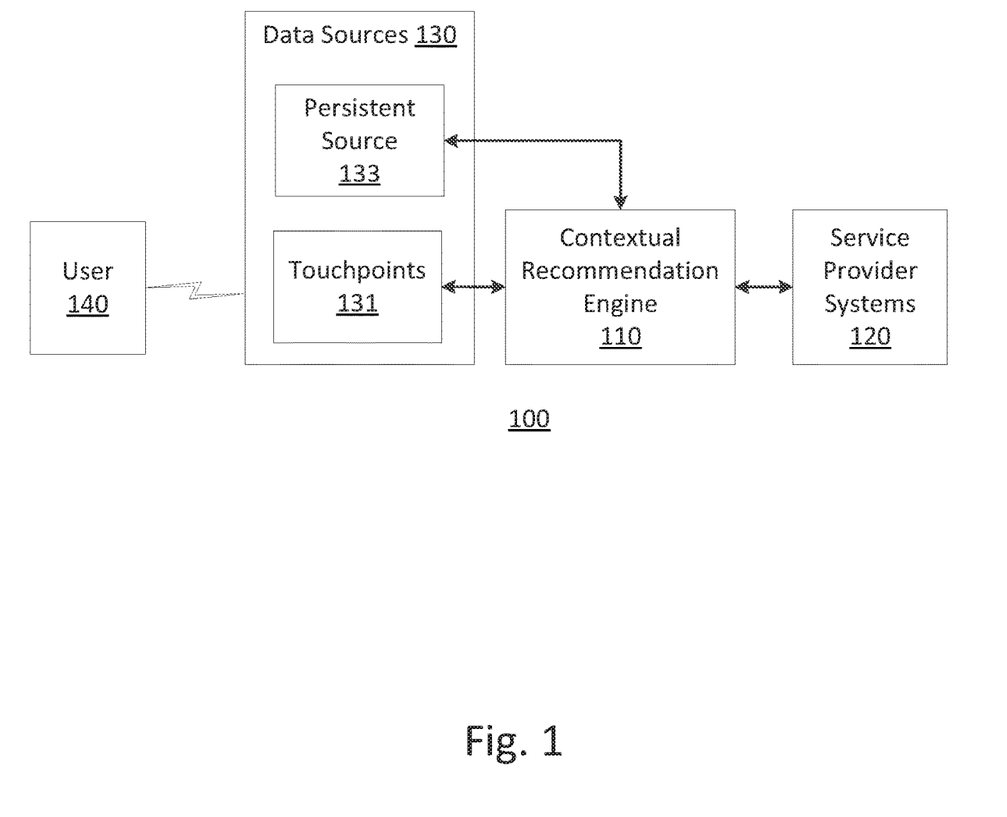
FIG. 1 depicts a schematic of an exemplary contextual recommendation system.

FIG. 1 depicts a schematic of an exemplary contextual recommendation system 100, consistent with disclosed embodiments. Contextual recommendation system 100 may comprise contextual recommendation engine 110, service providers 120, and data sources 130. Service provider systems 120 may be configured to provide descriptions of services to contextual recommendation engine 110. In some aspects, service provider systems 120 may be configured to provide rules for selecting services. In various aspects, service provider systems 120 may provide scripts that govern the offering and execution of provided services. In some aspects, service provider systems 120 may associate services with existing scripts stored by contextual recommendation engine. Data sources 130 may be configured to provide data concerning user 140. This data may be provided by touchpoints 131 and persistent source 133. Contextual recommendation engine 110 may be configured to extract contextual information for user 140 from the data received from data sources 130. Contextual recommendation engine 110 may update a stored context for user 140. Subsequently, contextual recommendation engine 110 may select and validate services. In some embodiments, contextual recommendation engine 110 may be configured to select services based on stored rules, and on the stored context for user 140. Contextual recommendation engine 110 may be configured to communicate with services providers 120 to validate one or more of the selected services. Contextual recommendation engine 110 may be configured to communicate with touchpoints 131 to offer at least one validated service to user 140. Contextual recommendation engine 110 may be configured to provide instructions to a touchpoint (e.g., one of touchpoints 131) for providing the service to user 140. In some aspects, contextual recommendation engine 110 may be configured to provide instructions to service providers 120. These instructions may enable the touchpoint to provide the contextually selected service to user 140.

Contextual recommendation engine 110 may include one or more computing devices, such as servers, workstations, desktop computers, or special-purpose computing devices, consistent with disclosed embodiments. Contextual recommendation engine 110 may be standalone, or it may be part of a subsystem, which may be part of a larger system. For example, contextual recommendation engine 110 may comprise distributed servers that are remotely located and communicate over a public network or a dedicated private network. In some embodiments, contextual recommendation engine 110 may be implemented at least in part as a virtual system on a cloud-computing infrastructure. Consistent with disclosed embodiments, contextual recommendation engine 110 may include or communicate with one or more storage devices configured to store data and/or software instructions.

The stored data and/or software instructions may include one or more software programs. Contextual recommendation engine 110 may execute the stored one or more software programs to perform one or more methods consistent with the disclosed embodiments. In certain aspects, contextual recommendation engine 110 may execute the stored one or more software programs remotely from contextual recommendation engine 110. For example, contextual recommendation engine 110 may access one or more remote devices to execute the stored one or more software programs. In certain embodiments, contextual recommendation engine 110 may be configured as a particular apparatus or system based on the storage, execution, and/or implementation of the software instructions. Contextual recommendation engine 110 may be configured to communicate with other components of contextual recommendation system 100, such as data sources 130 and service providers 120.

Service provider systems 120 may comprise one or more computing devices, such as servers, workstations, desktop computers, embedded devices, or special-purpose computing devices, consistent with disclosed embodiments. In some aspects, data sources 130 may comprise multiple distinct data sources associated with distinct entities. These data sources may be standalone, or it may be part of a subsystem, which may be part of a larger system. For example, service provider systems may include a local content system of an airport, which may be configured to manage parking and valet services; an auxiliary services system of an airline, which may be configured to manage seat upgrades, extra baggage fees, in-flight meals, and similar airline services; property management systems that may be configured to manage hotel reservations; non-bookable services systems that may be configured to manage services affecting user 140 that are not purchased, such as rebooking of flights or other transportation options; and merchandise systems that may be configured to enable user 140 to order goods and services (e.g., a point of sale system for an online store). Data sources 130 may be configured to communicate with other components of contextual recommendation system 100, such as contextual recommendation system 110.

Service provider systems 120 may be configured to provide descriptions of services to contextual recommendation engine 110. These descriptions may correspond to services potentially available from the entity associated with service provider system 120. For example, when the service is parking, the service description may include the location of the parking lot and one or more parking rates. The service description may include instructions for using the service. For example, when the service is valet, the service description may include instructions on where to leave the car. The service description may not account for current availability information. For example, a parking facility may have short and long term parking at different rates. The service description may describe both types of parking, regardless of whether the short or long term parking section is currently full.

Data sources 130 may include one or more computing devices, such as servers, workstations, desktop computers, embedded devices, or special-purpose computing devices, consistent with disclosed embodiments. In some aspects, data sources 130 may comprise multiple distinct data sources associated with distinct entities. These data sources may be standalone, or it may be part of a subsystem, which may be part of a larger system. Data sources 130 may be configured to communicate with other components of contextual recommendation system 100, such as contextual recommendation system 110. In some embodiments, data sources 130 may be configured to communicate with user 140. This communication may be direct. For example, data sources 130 may be configured to expose user interfaces for interaction with user 140. This communication may be indirect. For example, data sources 130 may comprise one or more repositories of information provided by user 140 to other systems.

Data sources 130 may comprise touchpoints 131, consistent with disclosed embodiments. Touchpoints 131 may comprise devices providing an interface for providing information to user 140 and/or gathering information concerning user 140. Touchpoints 131 may enable contextual recommendation system 110 to gather information about the current environment of user 140. For example, in some aspects, a touchpoint may be configured to provide a location (e.g., a GPS-enabled device or a cellular device). Contextual recommendation system may be configured to assume this location is the location of user 140. Similarly, such devices may provide rate of speed, prior history, and/or estimated time of arrival or destination information. As an additional example, a touchpoint may be configured to provide computer use information, such as a browsing history. Touchpoint information 131 may indicate that user 140 is using a device. For example, an automobile user interface may be configured to indicate that the user is in the automobile, or is driving the automobile. A touchpoint may also provide other information about the current environment of user 140, for example whether the user is in a traffic jam. As would be appreciated by one of skill in the art, the above description is not intended to be limiting.

Data sources 130 may comprise persistent sources 133, consistent with disclosed embodiments. Persistent sources 133 may comprise one or more repositories of information concerning user 140. Persistent sources 133 may be implemented using one or more computing devices, such as servers, workstations, desktop computers, or special-purpose computing devices, consistent with disclosed embodiments. In some aspects, persistent sources 133 may comprise multiple distinct data sources associated with distinct entities. These data sources may be standalone, or it may be part of a subsystem, which may be part of a larger system. For example, persistent sources 133 may comprise distributed servers that are remotely located and communicate over a public network or a dedicated private network. In some embodiments, persistent sources 133 may be implemented at least in part as one or more virtual systems on a cloud-computing infrastructure.

Data sources 130 may include one or more computing devices, such as servers, workstations, desktop computers, embedded devices, or special-purpose computing devices, consistent with disclosed embodiments. In some aspects, data sources 130 may comprise multiple distinct data sources associated with distinct entities. These data sources may be standalone, or it may be part of a subsystem, which may be part of a larger system. As a non-limiting example, data sources 130 may comprise data sources associated with multiple different entities. For example, data sources may include systems of one or more airlines, hotels, travel management companies, credit card companies.

In some aspects, the data provided by persistent sources 130 may differ from the data provided by touchpoints 131. In some aspects, the data provided by persistent sources 130 may concern information about user 140. For example, persistent sources 130 may include a user profile including demographic, address, and/or financial information about user 140. As an additional example, persistent sources 130 may include a business information system storing rules governing the purchases by user 140 (e.g., rules governing reservation of travel and accommodations). As a further example, persistent sources 130 may include a total travel record for user 140. The total travel record may include a current itinerary for user 140. The total travel record may also include other itineraries for user 140, such as previous itineraries. The total travel record may further include a record of service offers made to user 140, and whether those service offers were accepted or rejected. As an additional example, persistent sources 130 may include a passenger notification engine. The passenger notification engine may be configured to communicate information from a travel provider to user 140. This information may concern transportation, accommodations, entertainment, and related services. For example, the passenger notification engine may provide information concerning canceled or delayed flights, or information concerning hotel reservations. In addition to providing this information to user 140, passenger notification engine may be configured to provide this information to contextual recommendation engine 110.

In some embodiments, the components of contextual recommendation system 100 may be configured to communicate over one or more networks. This network may include any type of network (including infrastructure) that provides communications, exchanges information, and/or facilitates the exchange of information, such as the Internet, a Local Area Network, or other suitable connection(s) that enables contextual recommendation engine 110 to send and receive information between the components of contextual recommendation engine 110.

As would be recognized by one of skill in the art, the description of contextual recommendation system 100 in FIG. 1 is not intended to be limiting. In some embodiments, additional elements may be added, and/or the depicted elements of contextual recommendation system 100 may be combined, divided, modified, or removed. For example, envisioned embodiments may implement a superset or a subset of the depicted elements of contextual recommendation system 100. As an additional example, in some embodiments, additional systems may be interposed between contextual recommendation engine 110 and other components of contextual recommendation system 100. For example, one or more third party systems may be configured to transfer data and/or instructions between data sources 130 and contextual recommendation engine 110, or between service provider systems 120 and contextual recommendation engine 110. In some embodiments data sources 130 may not include persistent data 133, or one or more of persistent data 133 and touchpoints 131 may be a component of contextual recommendation engine 110 or service providers 120.

Figure 2:
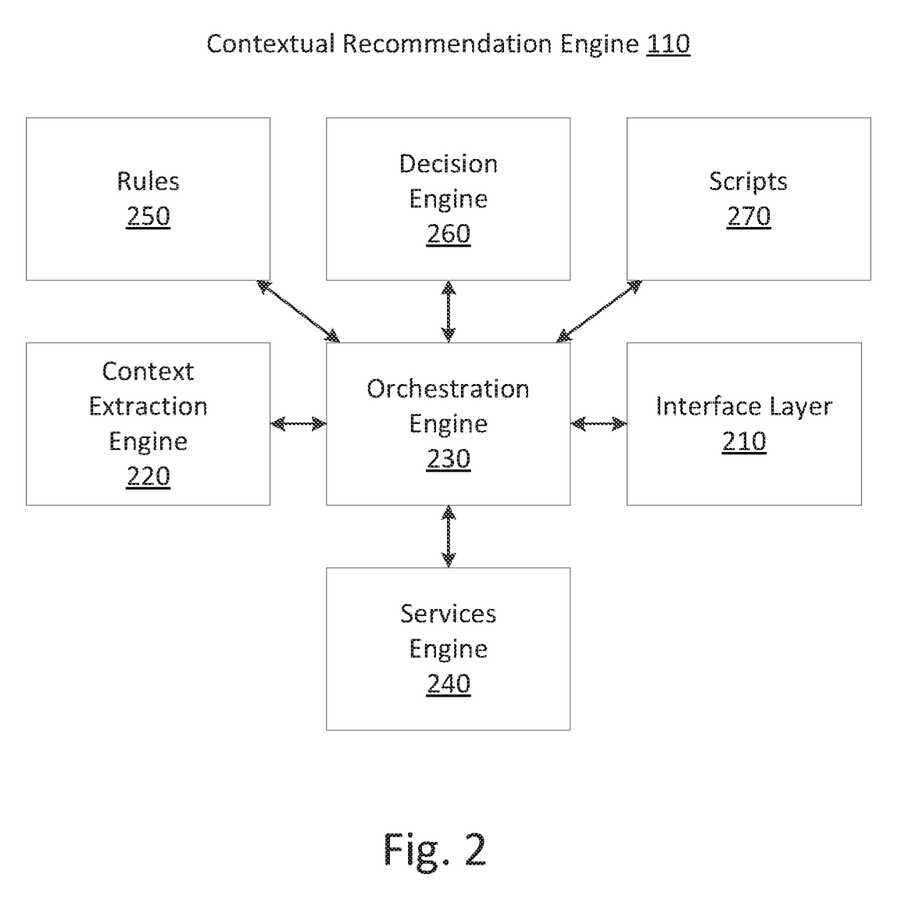
FIG. 2 depicts components of a contextual recommendation engine.

FIG. 2 depicts a components of contextual recommendation engine 110, consistent with disclosed embodiments. In some embodiments, contextual recommendation engine 110 may comprise interface layer 210, context extraction engine 220, orchestration engine 230, services engine 240, rules 250, decision engine 260, and scripts 270. These components may interact to provide contextual service recommendations.

Interface layer 210 may be configured to enable contextual recommendation engine 110 to interact with other components of contextual recommendation system 100, and with other systems, consistent with disclosed embodiments. In some embodiments, interface layer 210 may be configured to expose one or more web services. The one more web service may include one or more of JSON-WSP or SOAP-WSDL. The implemented web service may be implemented as a representational state transfer web service. In various embodiments, the interface layer may also be configured to provide SMS and email notifications according to methods known to one of skill in the art. In some embodiments, interface layer 210 may be configured to interact with another component of contextual recommendation system 100 according to a predetermined protocol. For example, a third party system expose one or more data sources that can be accessed according to a specific protocol. In some aspects, a touchpoint may be connected to an intermediate system that allows for communication of data and/or instructions with the touchpoint. For example, automobile user interfaces may be connected to a system maintained and/or controlled by the manufacturer of the automobiles. This system may provide one or more protocols for accessing information provided by the user interfaces, or providing instructions to the user interfaces. Interface layer 210 may be configured to communicate with such an automobile user interface by providing or receiving data or instructions to this system using the one or more protocols. In some aspects, interface layer 210 may be configured to interact with a touchpoint directly. For example, interface layer 210 may use a driver to directly provide or receive information from a touchpoint.

In some embodiments, interface 210 may be configured to translate scripts for offering a service or executing a service. For example, interface 210 may receive a touchpoint independent script that includes instructions for offering a service or executing a service. Interface 210 may be configured to determine the intended touchpoint and generate touchpoint dependent instructions for execution on the touchpoint. For example, an instruction may direct a touchpoint to guide user 140 to the location of the validated relevant service. In this example, interface 210 may be configured to respond to this message by sending an SMS message (for example an SMS message containing desired location data) to a cellular phone of user 140. Alternatively or additionally, interface 210 may be configured to respond to this message by providing instructions to an automotive user interface associated with user 140. These instructions may cause the automotive user interface to provide voice commands guiding the user to the desired location. Interface 210 may be configured to provide the translated instructions sequentially, for example as contextual criteria are satisfied, or all at once.

Context extraction engine 220 may be configured to update a context of user 140, consistent with disclosed embodiments. The context may comprise data and/or instructions stored in a non-transitory medium. These data and/or instructions may describe pertinent facts about user 140 that may be relevant to the recommendation of services. For example, the context may include the variable InCar with the boolean value "true." Similarly, the context may include the variable DistanceFromAirport with the numerical value 16.5. Additionally, the context may include the variable DepartureTerminal with the categorical variable "1." In some embodiments, content extraction engine 220 may be configured to receive data from data sources 130. For example, content extraction engine 220 may be configured to communicate with data sources 130 using interface 210 to receive data concerning user 140. In some embodiments, context extraction engine 220 may be configured to maintain a unified context for multiple users. In some embodiments, context extraction engine 220 may be configured to provide contextual information for users similar to user 140. In some aspects, this similarity may depend on the context of the users. As a non-limiting example, the users may be in the same location, or may be using the same services, as user 140. As another non-limiting example, the users may be related. For example, when a plane carrying user 140 lands, orchestration engine 230 may request contextual information for a friend, relative, or spouse of user 140. This information may be provided by context extraction engine 220 in response to a request by orchestration engine 230. Context extraction engine 220 may be configured to normalize the received data from each data source, and may cross reference the normalized data from different data sources to update the context for user 140. Context extraction engine 220 may be configured to update the stored context for user 140, and may provide the updated context to orchestration engine 230.

Orchestration engine 230 may be configured to manage data flows through contextual recommendation engine 110, consistent with disclosed embodiments. In some embodiments, orchestration engine 230 may be configured to receive at least one of context from context extraction engine 220, rules from rule 250, descriptions of potentially available services from services engine 240, and scripts from scripts 270. In some embodiments, orchestration engine 230 may be configured to provide the context, rules, and descriptions of potentially available services to decision engine 260. Orchestration engine 230 may be configured to receive from decision engine 260 a selection of relevant service descriptions. Orchestration engine 230 may be configured to provide these relevant service descriptions to services engine 240 for validation. Orchestration engine 230 may be configured to receive from services engine 240 information concerning validated, relevant service descriptions. Orchestration engine 230 may be configured to receive scripts from scripts 270. The scripts may comprise instructions for providing one or more services. Orchestration engine 230 may be configured to provide the scripts to interface 210. Orchestration engine 230 may be configured to provide the scripts sequentially, for example as contextual criteria are satisfied, or all at once.

In some embodiments, orchestration engine 230 may be configured to receive a notification from context extraction engine 220 when the context of user 140 changes. In various embodiments, orchestration engine 230 may be configured to receive a notification from a touchpoint (e.g., one of touchpoints 131). For example, a user may interact with the touchpoint to provide the notification. In various embodiments, orchestration engine 230 may be configured to request at least one of the context, rules, descriptions of potentially available services, and scripts in response to at least one of these notifications. Thus orchestration engine 230 may begin the process of recommending contextual services in response to a change in context for user 140, or a request by user 140.

Services engine 240 may comprise a database configured to store information concerning potentially available services. For example, services engine 240 may be configured to store service descriptions for a service. In some embodiments, the service descriptions may include information not dependent on the current availability of the service. For example, the service description may include one or more of the type of service, the general location of the service, and the a general price of the service. As an additional example, when the service is parking, the service description may identify the service as parking, provide the location of the parking facility (as opposed to a location within the facility, which may require current availability information), and a range of prices (as opposed to specific price information, which may be dynamically generated based on availability, time, and other factors). In various embodiments, the service descriptions may comprise a list of services. Each potentially available service may be uniquely identified in the list. Services engine 240 may be configured to receive the service information from service providers 130. In some embodiments, services engine 240 may be configured to use interface 210 to communicate with the service providers.

Rules 250 may comprise a database configured to store rules for selecting services, consistent with disclosed embodiments. In some aspects, rules 250 may be configured to receive the rules from another system. For example, rules 250 may be configured to interact with a business management system of a company to retrieve corporate policies and/or rules regarding business travel. In some embodiments, rules 250 may be configured to store criteria for ranking services. Rules 250 may be configured to provide the rules and/or criteria to orchestration engine 230. The rule and/or criteria may be provided in response to a request from to orchestration engine 230. In some embodiments, the rules may comprise instructions for mapping from a context to a service. The rules may depend on the context, and may also depend on the description of the service. For example, a rule may comprise a Boolean expression, such as: InCar∪ReturnTrip∪Late∪NoValetBookedAtAirport→OfferValet. When the contextual variables InCar, ReturnTrip, Late, and NoValetBookedAtAirport are true, then the service OfferValet would be recommended.

Because service provider systems 120 may be configured to dynamically manage large inventories of services, contextual management engine 110 may be configured to avoid re-creating these large inventories of services when determining services to recommend. Decision engine 260 may be therefore configured to make an initial selection of relevant services based on potential availability. In some embodiments, decision engine 260 may be configured to receive one or more of rules, context, and descriptions of services from orchestration engine 230. In some embodiments, decision engine 260 may be configured to apply the rules to the context and the service descriptions to select services. For example, when the service descriptions included a valet, and the context included InCar, ReturnTrip, Late, and NoValetBookedAtAirport with the value true, then the rule above would cause decision engine 260 to select service descriptions including a valet. Decision engine 260 may be configured to provide the selected services to orchestration engine 230.

Decision engine 260 may be configured to select among validated services, consistent with disclosed embodiments. These validated services may be associated with current availability information retrieved by services engine 240. In some embodiments, decision engine 260 may be configured to receive the validated services from orchestration engine 230. Decision engine 260 may be configured to rank the validated services according to criteria received from orchestration engine 230. For example, the services may be ranked based on at least one of current location, cost, current delay in obtaining service, estimated arrival time at service location, estimated departure time from service location, or similar information concerning the current availability of the validated services. In some embodiments, the criteria may be expressed as one or more of weights and thresholds. For example, numerical information may multiplied by a criterion expressed as a number to generate a corresponding numerical value of the numerical information. Boolean-valued information may be assigned a numerical value based on the truth value of the Boolean-valued information. Categorical information may be assigned a numerical value based on the categorical value of the categorical information. Decision engine 260 may be configured to determine values based on such numerical values. For example, decision engine 260 may be configured to sum these numerical values to generate a rank value. The overall ranking of the validated services may depend on the relative values of these rankings. Decision engine 260 may be configured to select one or more of the validated services according to the ranking. As a non-limiting example, decision engine 260 may select the top-ranked one, two, three, or more of the validated services. Decision engine 260 may be configured to provide these top-ranked validated services to orchestration engine 230. As would be appreciated by those of skill in the art, this particular method of ranking services is not intended to be limiting.

Scripts 270 may comprise a database storing scripts, consistent with disclosed embodiments. In some embodiments, the scripts may comprise instructions. These instructions may include offer instructions that define the process of offering a service to a user. These instructions may also include execution instructions that define the process of executing the service. In some embodiments, the instructions may be touchpoint-independent. For example, the instructions may not be limited to a particular touchpoint, but rather may be implementable on a wide variety of touchpoints. The instructions may implement a model of the interaction between the user and the service provider. For example, the instructions may describe a sequence of states in the provision of the service, and potential transitions among the states. For example, a set of offer instructions for a parking service may include providing a sequence of options to user 140 related to the parking services. These options may include selection of a parking lot, a particular parking space (e.g., handicapped or electric car charging), a payment option, and any additional services, such as car detailing. Likewise, a set of execution instructions for a parking service may include directions to the lot, and directions to the selected parking place within the lot. In some embodiments, scripts may include instructions for a service provider. For example, the execution instructions may include instructions to the service provider identifying the user. As a non-limiting example, the instructions may include information identifying the car of user 140, enabling user 140 to enter the parking lot, such as an RFID value, or a license plate number. As an additional example, the execution instructions may include instructions to another user. For example, a passcode may be sent to the phone of another user. This other user, or user 140 may enter this passcode to the car of user 140 to enter the parking lot. Because these options are touchpoint-independent, they may be suitable for a variety of touchpoints. In some embodiments, using context information, contextual recommendation engine 110 may be configured to select a touchpoint appropriate for an offer. For example, if the offer requires display of images, contextual recommendation engine 110 may be configured to select a touchpoint with a display. In some embodiments, the touchpoint provider would be responsible for mapping the instructions of the script to the instructions provided to user 140. For example, the script may include the instruction "confirm service purchase." The particular voice command or prompt corresponding to that instruction may differ between touchpoints, while the overall semantics of the instruction are preserved.

Figure 3:
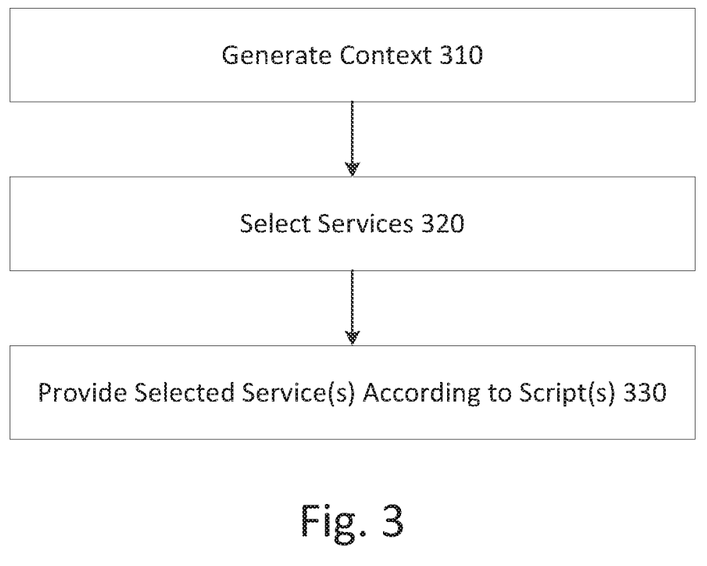
FIG. 3 depicts an exemplary process for contextual service provision.

FIG. 3 depicts an exemplary process for contextual content provision, consistent with disclosed embodiments. In step 310 of the process, contextual recommendation engine 110 may be configured to generate context for user 140. As described above, contextual recommendation service 110 may be configured to receive data from data sources 130. Contextual recommendation engine 110 may be configured to generate the context using these data. In step 320, contractual recommendation engine 110 may be configured to select relevant services for user 140. Descriptions of these services may be received by contractual recommendation engine 110 from service providers 120. In some embodiments, rules governing recommendation of services in particular contexts may be received from another component of contextual recommendation system 100, or another system, such as a business management system. Contextual recommendation engine 110 may be configured to apply the rules to the context for user 140 to select relevant services. Contextual recommendation system 110 may also be configured to validate the relevant services, and may further select high-ranking service(s) from among the relevant services. The selected service(s) may be associated with scripts that define the offering and/or execution of the selected service. In step 330, contextual recommendation system 110 may be configured to provide the selected service(s) according to the associated script(s). The selected services may be provided to a touchpoint of user 140. The selected services may also be provided to a touchpoint associated with another user. The selected services may be provided to one of more of service providers 120.

Figure 4:
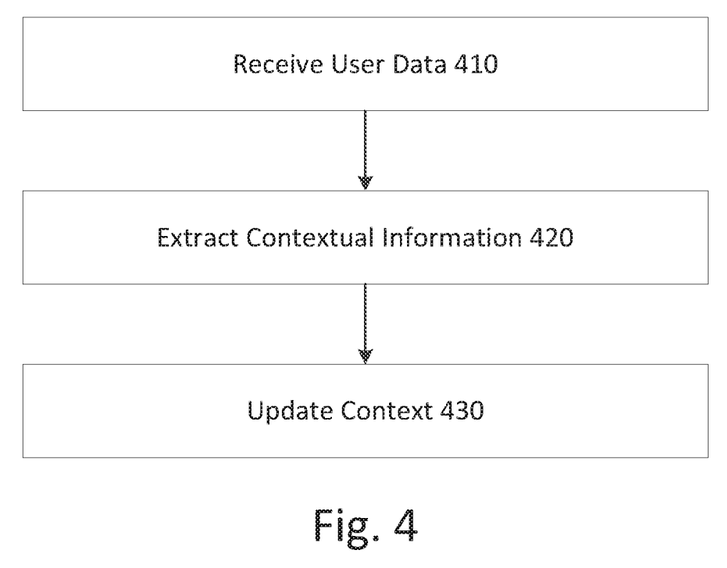
FIG. 4 depicts an exemplary process for updating user context.

FIG. 4 depicts an exemplary process for updating user context, consistent with disclosed embodiments. This exemplary process may be performed as part of step 310 by components of contextual recommendation engine 110, such as context extraction engine 220. In step 410, context extraction engine 220 may be configured to receive user data. In some aspects, context extraction engine 220 may be configured to communicate with data sources 130 using interface layer 210 to receive the user data. The user data may include touchpoint data and persistent data, as describe above with regard to FIG. 1. In step 420, context extraction engine 220 may be configured to extract contextual information from the user data. In some embodiments, context extraction engine may be configured to apply a schema to the received data to extract the contextual information. Such a schema may define the semantics of the user data, and may be specific to the source of the user data. In step 430, context extraction engine 220 may be configured to update a context of user 140. As described above, the context of user 140 may be stored by contextual recommendation engine 110. The context of user 140 may be part of an overall context for multiple users. Context extraction engine may also be configured to provide a notification that the context for user 140 has changed to another component of contextual recommendation engine 110, such as orchestration engine 230.

Figure 5:
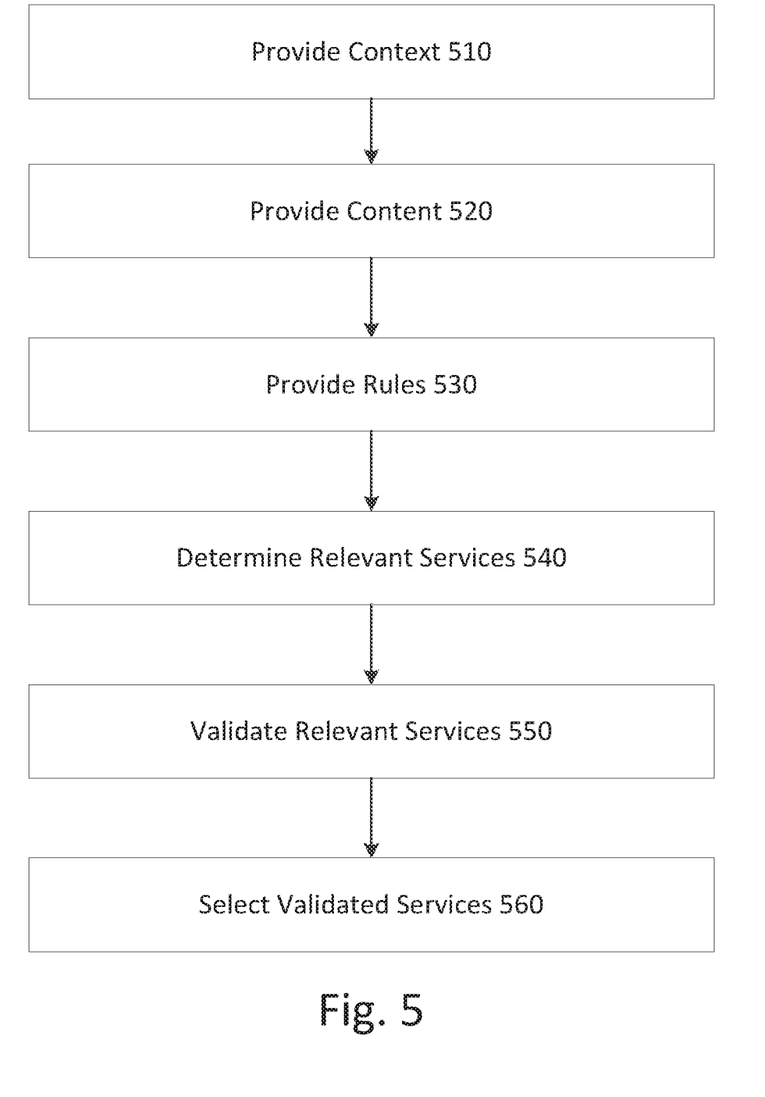
FIG. 5 depicts an exemplary process for selecting services.

FIG. 5 depicts an exemplary process for selecting services, consistent with disclosed embodiments. This exemplary process may be performed as part of step 320 by components of contextual recommendation engine 110, such as orchestration engine 230, services engine 240, and decision engine 260. In step 510, orchestration engine 230 may be configured to provide context for user 140 to decision engine 260. This context may have been received from context extraction engine 220. As described above, this context may contain facts about user 140 that are pertinent to the recommendation of services. In step 520, orchestration engine 230 may be configured to provide rules to decision engine 260. These rules may comprise instructions for mapping context to services. As described above, the rules may include Boolean equations, though this description is not intended to be limiting. The rules may have been received by rules 270 from another system, such as a business management system, or may have been provided by an operator of contextual recommendation engine 110. In step 530, orchestration engine 230 may be configured to provide descriptions of potential services to decision engine 260. In some aspects, the descriptions of potential services may include information not dependent on the current availability of the services. In various aspects, the descriptions of potential services may include identifiers uniquely describing the services. The descriptions of services may have been received by services engine 240. In step 540, decision engine 260 may be configured to determine relevant services. Decision engine 260 may be configured to determine the relevant services based on the received rules, context, and descriptions of services. In some embodiments, decision engine 260 may be configured to determine the services by applying the rules to the context to identify relevant services. Decision engine 260 may be configured to provide the relevant services to orchestration engine 260. In step 550, orchestration engine 260 may be configured to indicate the relevant services to services engine 240. In some aspects, services engine 240 may be configured to obtain service information concerning the current availability of the selected services. For example, service engine 240 may be configured to communicate with the service provider systems 120 using interface layer 210 to receive service information concerning the current availability of the selected services. Services engine 240 may be configured to provide the service information concerning the current availability of the selected services to orchestration engine 260. In step 560, orchestration engine 230 may be configured to provide the service information to decision engine 260. In some embodiments, decision engine 260 may be configured to select a subset of the validated services. In some aspects, decision engine 260 may be configured to rank the validated services using the service information and criteria received from orchestration unit 230, as described above. Decision engine 260 may be configured to provide a subset of the highest ranked services to orchestration unit 230.

Figure 6:
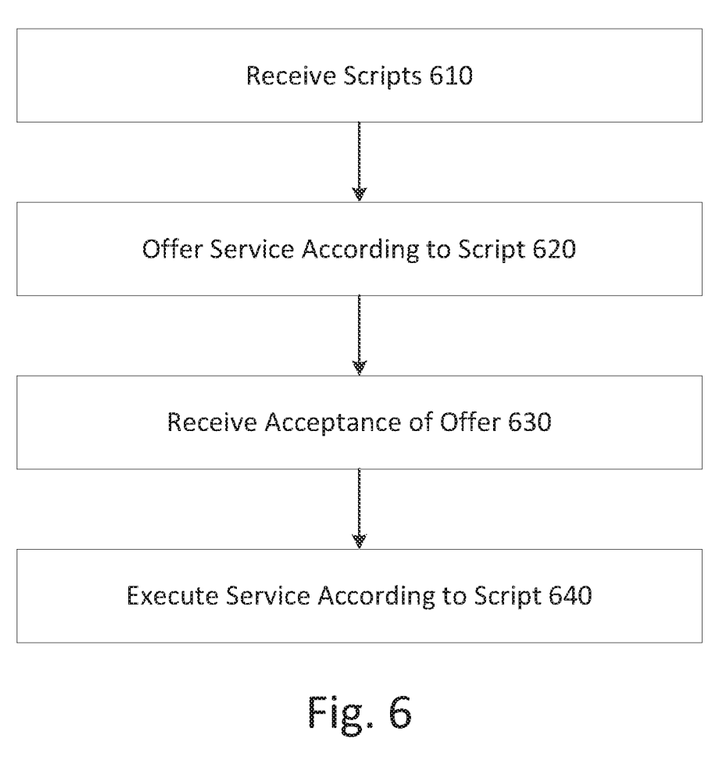
FIG. 6 depicts an exemplary process for provide services according to a script.

FIG. 6 depicts an exemplary process for provide services according to a script, consistent with disclosed embodiments. This exemplary process may be performed as part of step 310 by components of contextual recommendation engine 110, such as scripts 270, orchestration engine 230, and interface layer 210. In step 610, orchestration engine 230 may be configured to receive a script from scripts 270. The scripts may be associated with a relevant service, as described above. In some embodiments, the script may comprise touchpoint-independent instructions. These instructions may include offer instructions for offering the relevant service to user 140 and execution instructions for executing the service. In step 620, orchestration engine 230 may be configured to offer the service according to the script. For example, orchestration engine 230 may provide instructions for providing the offer to user 140 to a touchpoint associated with user 140. In some aspects, orchestration engine 230 may be configured to communicate with the touchpoint associated with user 140 using interface layer 210. In some embodiments, interface layer 210 may be configured to translate the instructions for provision to the touchpoint as described above. The instructions may be provided all at once, or may be provided sequentially. For example, the instructions may be provided when contextual criteria are satisfied, or as needed by user 140. In step 630, orchestration layer may be configured to receive an indication of acceptance by user 140 of the offer. In some embodiments, this indication may be received from interface layer 210. In step 640, orchestration engine 230 may be configured to execute the service according to the script. For example, orchestration engine 230 may provide instructions for executing the service to at least one of a service provider, a touchpoint associated with user 140, and another user. In some aspects, orchestration engine 230 may be configured to communicate with the service provider, touchpoint associated with user 140, and/or other user using interface layer 210. In some embodiments, interface layer 210 may be configured to translate the instructions for provision to the touchpoint as described above. The instructions may be provided all at once, or may be provided sequentially. For example, the instructions may be provided when contextual criteria are satisfied, or as needed by user 140.

Figure 7:
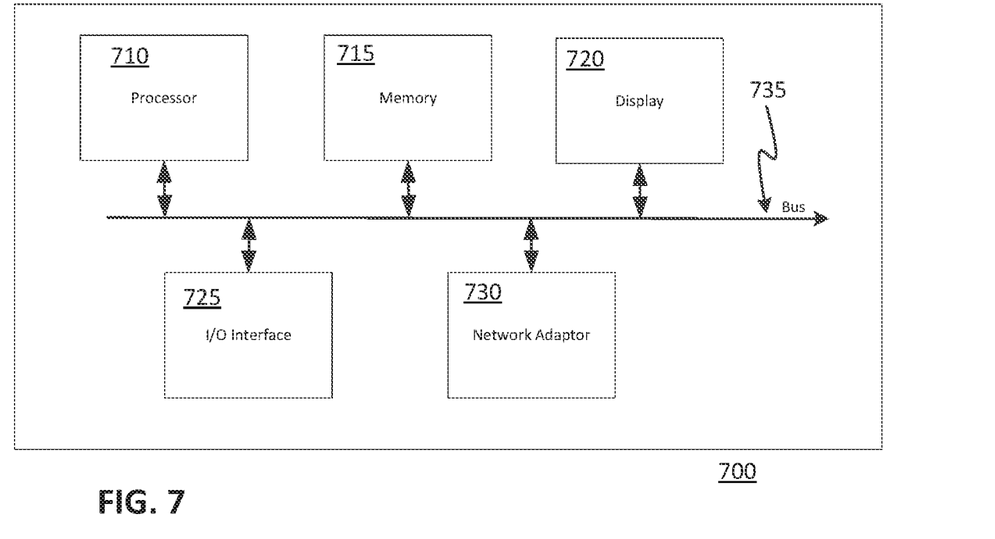
FIG. 7 depicts a schematic of an exemplary computing device for performing the envisioned systems and methods.

FIG. 7 depicts a schematic of exemplary computing system 700 for performing the envisioned systems and methods, consistent with disclosed embodiments. In some embodiments, computer system 700 includes a processor 710, memory 715, display 720, I/O interface(s) 725, and network adapter 730. These units may communicate with each other via bus 735, or wirelessly. The components shown in FIG. 7 may reside in a single device or multiple devices.

Consistent with disclosed embodiments, processor 710 may be a central processing unit (CPU), graphical processing unit (GPU), or similar microprocessor having one or more processing cores. Computer system 700 may include one or more processors 710 and may further operate with one or more other processors that are remote with respect to processors 710. Memory 715 may include non-transitory memory containing non-transitory instructions, such as a computer hard disk, random access memory (RAM), removable storage, or remote computer storage. In some aspects, memory 715 may be configured to store data and instructions, such as software programs. For example, memory 715 may be configured to store data and instructions. In some aspects, processor 710 may be configured to execute non-transitory instructions and/or programs stored on memory 715 to configure computer system 700 to perform operations of the disclosed systems and methods. In various aspects, as would be recognized by one of skill in the art, processor 710 may be configured to execute non-transitory instructions and/or programs stored on a remote memory to perform operations of the disclosed systems and methods.

Display 720 may be any device which provides a visual output, for example, a computer monitor, an LCD screen, etc. I/O interfaces 725 may include hardware and/or a combination of hardware and software for communicating information to computer system 700 from a user of computer system 700, such as a keyboard, mouse, trackball, audio input device, touch screen, infrared input interface, or similar device. Network adapter 730 may include hardware and/or a combination of hardware and software for enabling computer system 700 to exchange information using external networks. For example, network adapter 730 may include a wireless wide area network (WWAN) adapter, a Bluetooth module, a near field communication module, or a local area network (LAN) adapter.

Example: Parking Services

A user may enter a car including a user interface touchpoint. When the car is turned on, the touchpoint may be initialized, and may begin pushing touchpoint data to a contextual recommendation engine. The touchpoint may continue to push touchpoint data to the contextual recommendation engine without changing the context of the user.

Eventually, touchpoint data pushed to the contextual recommendation engine may change the context of the user. The context extraction engine may update the context and provide the updated context to the orchestrator engine. The orchestrator engine may request a list of services from the services engine. The services engine may provide a list of the potentially available services. The orchestrator may request rules from the rules database. The orchestrator may provide the rules, the context, and the list of services to the decision engine. The decision engine may select relevant services, including a parking service. The relevant services may be provided to the orchestration engine. The orchestration engine may provide the relevant services to the services engine, which may query the service provider systems for the relevant services to obtain information concerning the current availability of the relevant services. The services engine may provide this information to the orchestration system. The orchestration system may provide the information and the relevant services to the decision engine, which may rank the relevant services and may provide a subset of the relevant services to the orchestrator engine. In this example, the highest ranking service may be a parking service.

The orchestrator engine may retrieve a script for offering the parking service. The orchestrator may provide this script to the interface layer. The interface layer may provide instructions to the automobile user interface to offer the service to the user. The interface layer may additionally notify the user, or another user, through another touchpoint. The interface layer may communicate with the automobile user interface to receive an indication that the user accepted the offer. The interface layer may provide an indication that the user accepted the offer to the orchestration engine. The orchestration engine may be configured to provide instructions to the service engine to reserve the parking. The orchestration engine may be configured to provide instructions to context extraction engine to update the context of the user to indicate that the user has reserved parking.

The orchestrator engine may retrieve a script for executing the accepted parking service.

The orchestrator may provide this script to the interface layer. The interface layer may provide instructions to the automobile user interface for executing the service. In this example, the instructions may be provided all at once, rather than sequentially. Therefor the automobile user interface may be responsible for executing the workflow with the appropriate conditions are met. For example, in accordance with the provided execution instructions, the automobile user interface may offer to navigate the car to the location of the parking services. Once the user approaches with 200 meters of the location of the parking services, in accordance with the provided execution instructions, the automobile user interface may display an access code enabling the user to enter the facility providing the parking services. The interface layer may additionally notify the user, or another user, through another touchpoint.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A contextual recommendation engine comprising,
   at least one processor; and
   at least one non-transitory memory containing instructions that, when executed by the at least one processor, cause the contextual recommendation engine to perform operations comprising:
   receiving a description of a first service from a service provider;
   receiving content selection rules that map user contexts to services;
   receiving a first script including touchpoint-independent instructions for providing the first service;
   associating the first service with the first script;
   receiving, from a first touchpoint, touchpoint data concerning a first user;
   updating a context of the first user based on the touchpoint data;
   selecting the first service based on the updated context and the content selection rules;
   generating touchpoint-dependent instructions for providing the first service using the touchpoint-independent instructions; and
   providing the first service to the first user according to the first script using the touchpoint-dependent instructions.

2. The contextual recommendation engine of claim 1, wherein the first touchpoint differs from a second touchpoint used to the provide the first service.

3. The contextual recommendation engine of claim 1, wherein the first touchpoint comprises at least one of an embedded system or mobile system.

4. The contextual recommendation engine of claim 1, wherein a second touchpoint comprises a vehicle user interface or a mobile phone.

5. The contextual recommendation engine of claim 1, wherein the service provider comprises an ancillary services system, a property management system, a transportation reservation system, or a local content engine.

6. The contextual recommendation engine of claim 1, wherein the first service comprises at least one of creating, modifying, or cancelling a reservation concerning parking, transportation, accommodations, or entertainment.

7. The contextual recommendation engine of claim 1, wherein the first script comprises offer instructions and execution instructions, and wherein providing the first service comprises:
  providing, to at least a second touchpoint according to the offer instructions, instructions to offer the first service to the first user;
  receiving an acceptance indication; and
  providing, to at least the second touchpoint according to the execution instructions, instructions to execute the first service.

8. The contextual recommendation engine of claim 7, the operations further comprising updating the context of the first user based on receipt of the acceptance indication.

9. The contextual recommendation engine of claim 7, wherein providing instructions to execute the first service comprises providing instructions to the service provider.

10. The contextual recommendation engine of claim 7, wherein the at least one processor and the at least one non-transitory memory comprise a cloud computing system that hosts the contextual recommendation engine.

11. The contextual recommendation engine of claim 7, wherein providing instructions to execute the first service comprises providing instructions to a second user.

12. The contextual recommendation engine of claim 11, wherein the operations further comprise identifying the second user based on at least one similarity between a context of the second user and the context of the first user.

13. The contextual recommendation engine of claim 11, wherein the operations further comprise identifying the second user based on the context of the first user.

14. A system for contextual service recommendations, comprising:
  at least one processor; and
  at least one non-transitory memory containing instructions that, when executed by the at least one processor, cause the system to perform operations comprising:
    communicating with service providers to receive descriptions of services,
    receiving a context corresponding to a user,
    receiving rules mapping contexts to the services,
    determining relevant services using the received rules and the received context;
    communicating with the service providers to validate the relevant services;
    receiving a first script including touchpoint-independent instructions for providing a first validated service of the validated relevant services;
    generating touchpoint-dependent instructions for providing the first validated service using the touchpoint-independent instructions; and
    communicating with a first touchpoint of the user according to the first script using the touchpoint-dependent instructions to provide the first validated service.

15. The system of claim 14, wherein the operations further comprise:
  ranking the validated relevant services; and
  communicating with the first touchpoint of the user to provide a subset of the validated relevant services, the subset based on the ranking.

16. The system of claim 14, wherein the descriptions of services indicate potentially available services and wherein communicating with the service providers to validate the relevant services comprising obtaining present service availabilities.

17. The system of claim 14, wherein communicating with the service providers to validate the relevant services comprising obtaining at least one of current locations, current prices, and current delays associated with the relevant services.

18. The system of claim 14, wherein the operations further comprise receiving a service request from a second touchpoint of the user, and wherein the relevant services are determined in response to the received service request.

19. The system of claim 18, wherein the first touchpoint and the second touchpoint are the same touchpoint.

\* \* \* \* \*